(No Model.)

T. GOULDING.
PISTON.

No. 510,910. Patented Dec. 19, 1893.

Witnesses
Petter Chr. Carlsen.
Thea Carlsen.

Inventor
Thomas Goulding
By his Attorney:
Andrew M. Carlsen

THE NATIONAL LITHOGRAPHING COMPANY,
WASHINGTON, D. C.

UNITED STATES PATENT OFFICE.

THOMAS GOULDING, OF ST. PAUL, MINNESOTA.

PISTON.

SPECIFICATION forming part of Letters Patent No. 510,910, dated December 19, 1893.

Application filed December 12, 1892. Serial No. 454,947. (No model.)

*To all whom it may concern:*

Be it known that I, THOMAS GOULDING, a subject of the Queen of Great Britain, residing at St. Paul, in the county of Ramsey and State of Minnesota, have invented certain new and useful Improvements in Pistons; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in pistons of the kind usually employed in the cylinders of steam engines, gas engines, vapor engines, pumps, &c.

The object of my invention is to provide a piston in which the packing is not exposed to an unnecessary pressure, either against the walls of the cylinder or away therefrom, as is usually the case with the pistons heretofore used. I attain this object by the novel construction and arrangement of parts illustrated in the accompanying drawings, in which—

Figure 1:
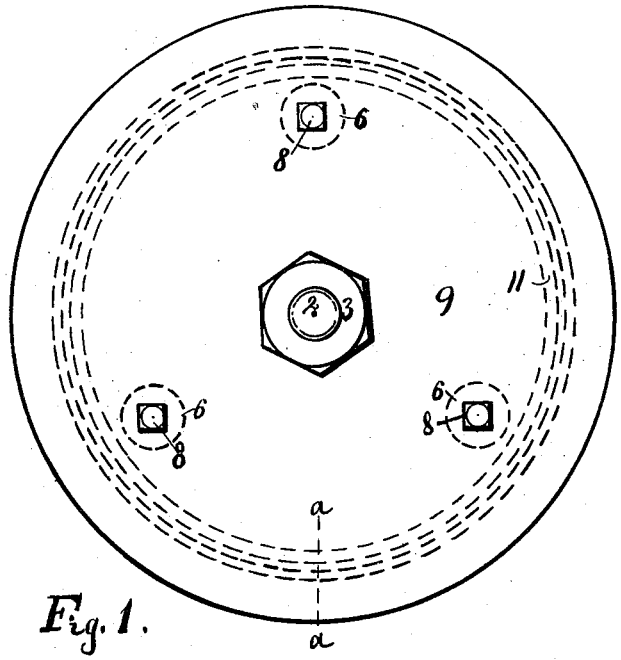
Figure 4:
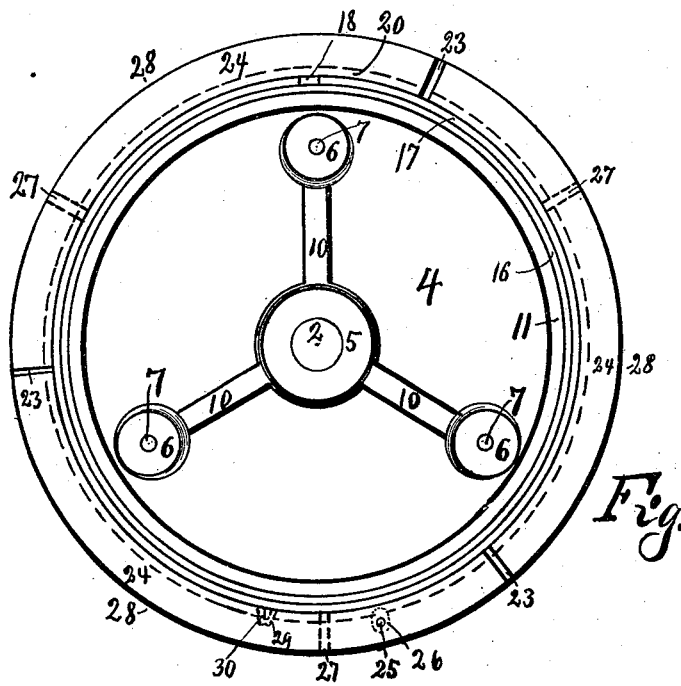
Figure 2:
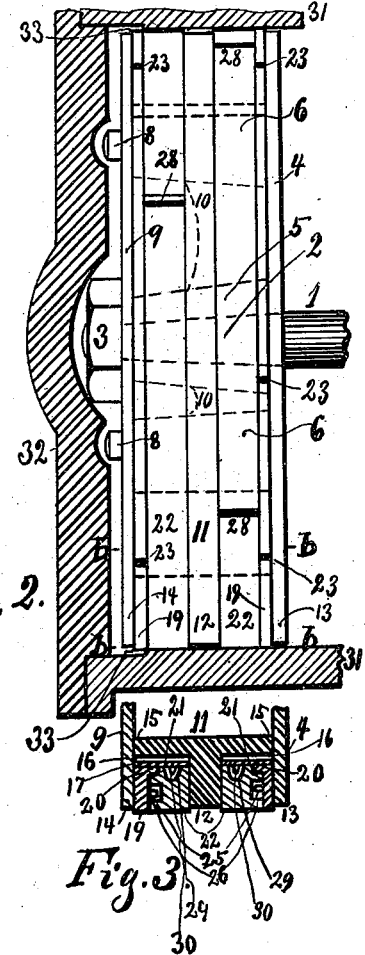
Figure 3:

Figure 1, is a plan view of my improved piston secured on a piston rod. Fig. 2, is an edge view of Fig. 1, with a portion of a cylinder and cylinder head in section added to it. Fig. 3, is a sectional view of a portion of the piston on the line *a, a,* in Fig. 1, or the radial plan *b, b, b, b,* in Fig. 2. Fig. 4, is a plan view, the same as Fig. 1, but with the follower removed so as to expose the interior of the piston.

Referring to the different parts in the drawings by reference numbers 1, is a portion of the piston rod, upon the taper end 2, of which is secured by a screw threaded nut 3, the piston head 4, which is cast with a centrally located hub 5, for the piston rod to be fitted and secured in, and three or more smaller lugs 6, in the top of which are screw-threaded holes 7, for receiving the screw-threaded ends of the cap screws 8, which pass through holes in the follower 9, and hold it firmly against the top ends of the lugs 6, while the nut 3, holds the center portion of the follower tight against the top of the large hub 5.

10, are radial ribs provided between the lugs 7, and the hub 5, for strengthening the piston head.

11, is the bull ring of the piston; this ring is an unbroken flat ring provided with a centrally and outwardly projecting rib 12, between which and the flanges or outer circumferential portion 13, of the piston head, and 14, of the follower, the packing rings and springs are located. The edges 15, of the bull ring 11, are by frictional contact with the piston head and the follower, held in any desired position relative to the center of the piston; hence, if the cylinder is a horizontal one, the weight of the piston may be prevented from wearing the piston head and the follower oval against the lower side in the cylinder, simply by adjusting from time to time the bull ring so low down that it keeps the piston up centrally with the cylinder.

The packing and springs of the piston being exactly alike at both sides of the rib 12, of the bull ring, I will describe only one of them.

16, is an annular space in which I place a hoop-shaped flat steel spring 17, consisting of a single piece of band spring steel, having its free ends coming almost together, leaving but a slight clearing 18, (see Fig. 4) for the play of the spring. Outside of the spring 17, and nearest to the flanges 13, and 14, I place a very narrow ring 19, provided with an annular rib or flange 20, fitting in a recess 21, formed at the inner corner of the larger ring 22, that comes in contact with said rib 20. The large ring 22, also rests upon the outer surface of the spring 17, which tends at all times to hold said packing rings 19, and 22, against the inner sides of the walls of the cylinder. The ring 19, is cut up at 23, into three segmental portions 24, one of which has a peg or pin 25, playing in a radially elongated hollow 26, in the side of the broad ring 22, which is also intersected at 27, into three segmental-shaped pieces 28, one of which is provided at its inner curved face with a hollow 29, fitting loosely over a peg 30, in the spring 17; thus the peg 30, keeps one, and thereby all, of the segmental-shaped pieces 28, in such relative position to the spring 17, that the opening 18, of the spring will always be covered by one of the segments, and the peg 25, keeps one, and thereby all, of the segments 24, in such relative position to the segments 28, and the opening 18, in the spring that no two openings will ever register with each other and allow steam to pass through them.

In Fig. 2, 31, represents end-portions of the sides of a horizontal cylinder; 32, is a cylinder head fitted thereto in the ordinary manner.

It will be observed that all well made cylinders are provided at their ends with annular internal recesses 33, to give a clearing for the piston at the ends of its stroke, as it would otherwise, when wearing the cylinder, leave the ends of it smallest and thus create a ridge to strike against. The springs and packing rings of a piston are apt to widen out and catch in the recess 33, as well as in the steam port usually entering the cylinder through a portion of said recess, thereby making it both deeper and wider. Another difficulty is that the steam entering the said recess 33, gets to the outside of the piston packing and compresses it into its groove in the piston thereby permitting the steam to escape to the opposite end of the cylinder. To overcome these difficulties tremendous stiff springs or even the life pressure of the steam have been employed to force the packing toward the walls of the cylinder causing great resistance and wear to these parts of the engine. To remedy this evil I use a wide packing ring 22, which receives no steam pressure upon its outside, as it does not enter the recess or enlarged space 33, and a narrow packing ring 19, which enters the recess 33, but can not be pressed toward the center by the steam, because its outer surface is so small in proportion to its thickness diametrically, and the force of the entire steel spring 17, that the steam pressure can not affect it. To prevent this narrow packing ring 19, from spreading and catching in the recesses 33, I provide them with the rib 20, fitting in the grooves 21, of the wider ring 22.

Having thus described my invention, what I claim, and desire to secure by Letters Patent, is—

1. The combination with the cylinder 31, having the recesses 33, and cylinder head 32, of a piston having the piston head 4, with the hub 2, and rod 1, secured therein, the lugs 6, a follower as 9, secured to said hub and lugs, the bull ring 11, having the external rib 12, the segmentally divided packing rings 22, having annular grooves as 21, the narrow segmentally divided packing rings, 19, having annular ribs as 20, fitting into the grooves 21, in the larger rings and suitable spring or springs for holding said packing rings properly pressed against the walls of the cylinder, substantially as and for the purpose specified.

2. In a piston the combination of the piston head 4, the follower 9, the bull ring 11, held by frictional contact between said follower and the piston head, and having the rib 12, the grooves 16, the broad segmentally divided packing rings 22, the narrow segmentally divided packing rings 19, located nearer to the ends of the piston than the broad packing rings, and having a rib as 20, engaging in an annular groove at the inner corner of the broad packing ring, an elastic outwardly pressing hoop-shaped thin steel spring as 17, pressing against the inner curved surface of all the segments of the narrow and the broad ring and suitable pins as 25, and 30, engaging in hollows as 26, and 29, for retaining the spring and the packing rings in such relative position that the solid parts of one ring cover the opening between the ends of the other ring and between the ends of the spring, substantially as shown and described and for the purpose set forth.

In testimony whereof I affix my signature in presence of two witnesses.

THOMAS GOULDING.

Witnesses:
ANDREW M. CARLSEN,
E. C. CARLSEN.